United States Patent Office 3,383,096
Patented May 14, 1968

3,383,096
DEVICE FOR AUTOMATICALLY KEEPING CONSTANT THE HARDNESS OF MIX, PARTICULARLY FOR ALIMENTARY PASTES
Mario Braibanti and Giuseppe Braibanti, both of Largo Toscanini 1, Milan, Italy
Continuation of application Ser. No. 361,757, Apr. 22, 1964. This application Dec. 5, 1966, Ser. No. 599,321
Claims priority, application Italy, Apr. 27, 1963, 8,780/63, Patent 695,472
14 Claims. (Cl. 259—25)

ABSTRACT OF THE DISCLOSURE

An apparatus for mixing a material while maintaining it at a predetermined degree of hardness, said device comprising at least two adjacent mixing stations connected by a passage in which is disposed means to pass a portion of the material between the mixing stations. A portion of the means defining the passage is displaceable in response to the pressure of the material flowing through said passage, and connecting means are provided which operatively connect said portion to regulating means for regulating an amount of water applied to said mixture in response to movement of said portion.

---

This application is a continuation of application Ser. No. 361,757, filed Apr. 22, 1964, now abandoned.

It is an object of the present invention to provide a device for automatically keeping constant the hardness and consistency of the mix, independently of the moisture of the raw material and of a possible variation of the quantity of raw material and of the mixing water owing to variation of pressure.

Figure 1:
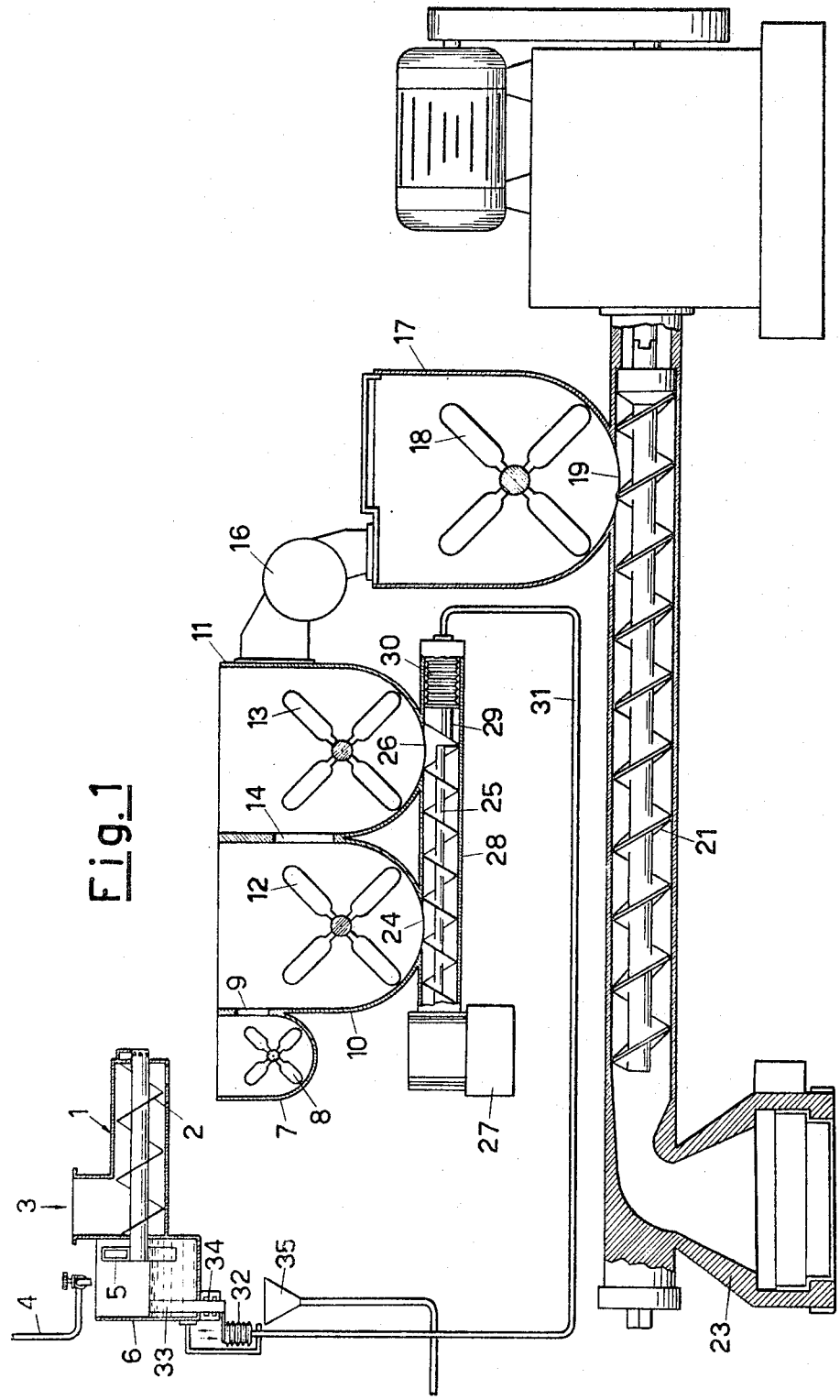
Figure 2:
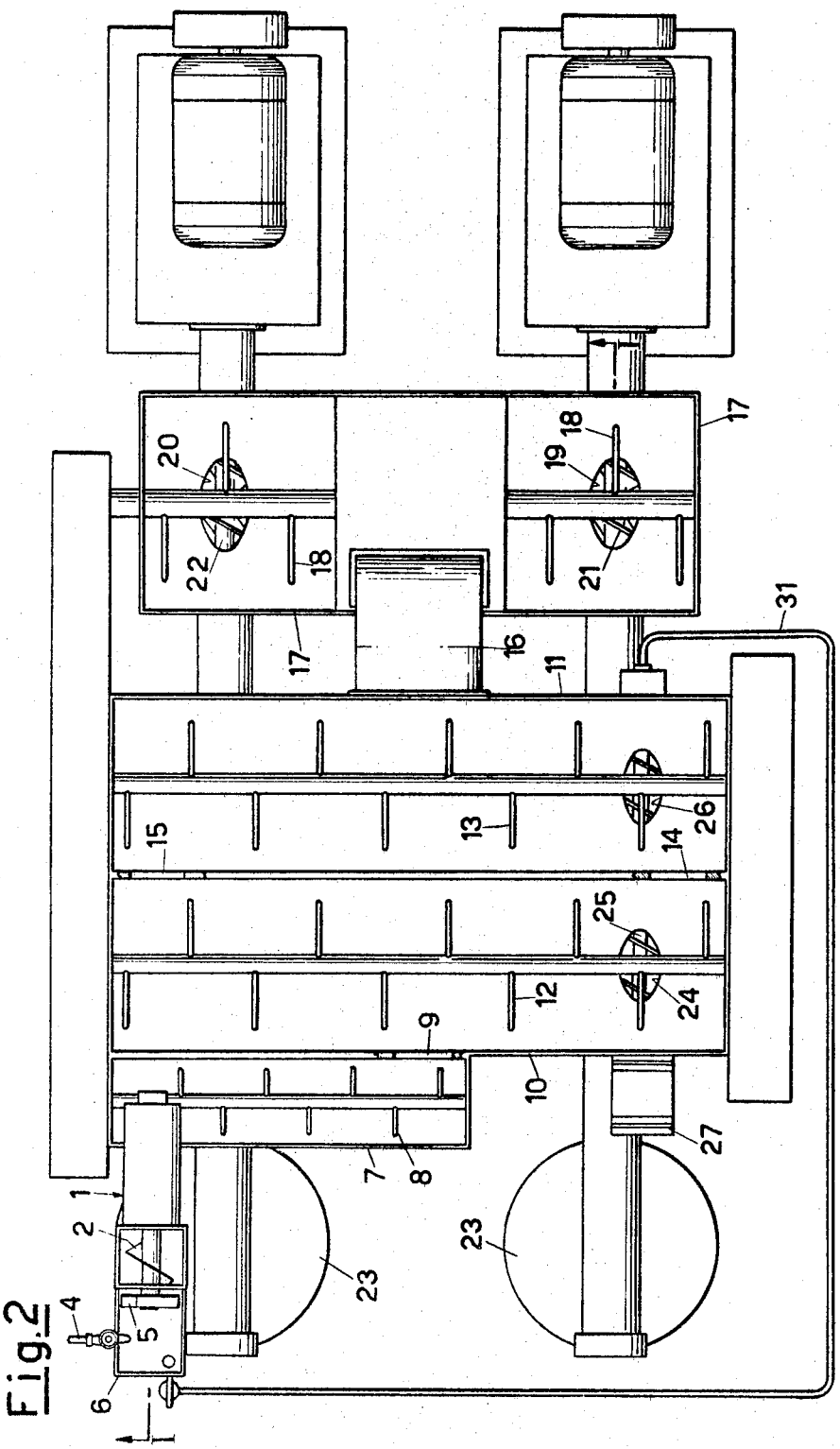

It is an object of the present invention to provide a device sensitive to every variation of the consistency of the mix being worked in the machine and transmitting over a distance the suitable controls for varying the quantity of water needed for said mix so as to keep said hardness constant. The device according to the invention, provided in order to automatically adjust the percentage of water in a mix, particularly for alimentary pastes, that is produced in a machine wherein the mix passes in succession through two successive points of one and the same mixer or in two or more mixers after having been formed by means of the addition of a flow quantity of water controlled by an adjusting means, to a flow quantity, controlled by an adjusting means of the raw material, is characterized by a conduit connecting said two mixing vessels and equipped with means for forwarding the mix therein and with a member displaceable by effect of the pressure of the mix in said conduit, which member by its displacement governs said adjusting means for the flow quantity of water. The device according to the present invention will now be more fully described in one of its embodiments, that is given merely by way of example, with reference to the accompanying drawings, wherein:

FIG. 1 diagrammatically represents a vertical section of a mixing machine to which is applied the device according to the present invention, taken along the trace I—I of FIG. 2; and FIG. 2 shows a diagrammatical top view of the machine of FIG. 1.

With reference to the cited figures, the mixing machine equipped with the device according to the invention as described herein by way of example comprises a doser 1 with a feed screw 2 that is fed with the flour materials (not represented) by the mouth 3 and with water coming through the conduit 4 from a source (not represented). By the rotary movement of the screw 2 the flour material, wetted with the water taken by a noria water wheel 5 in a vat 6 at constant level, controlled as will be explained, a number of times, is introduced into a vat 7 equipped with vanes or blades 8, which mixes the flour material and the water thereby forming the mix and delivering it through the passageway 9, to the mixers constituted, in the example illustrated, by vats 10 and 11, respectively equipped with vanes or blades 12 and 13 connected by passageways 14 and 15 (through which passes the larger portion of the mix), which vats feed through the collector 16 the larger vat 17 which too is equipped with vanes or blades 18, which vat 17 in turn feeds through passageways 19 and 20 screws 21 and 22 which forward the mix to the bread-baking or the like through the outlets both indicated by 23.

The vat 10 is equipped on its bottom with a passageway 24 which permits the passage of a small portion of the mix to feed a small compression screw or conveyor 25 from which said small portion of mix is returned through the passageway 26 to the vat 11. The screw 25, which is driven by a motor reducer 27, is housed in the respective tubular casing 28, whose bottom opposed to that where the control 27 is placed, is closed by a piston 29 slidable in 28 and rigid to a bellows 30 which is connected, through a conduit 31 pneumatically to another bellows 32. The free end of the bellows 32 is rigid with the weir 33 of the over-flow relative to the water level in the tank 6 into which the water wheel 5 dips; said weir is resiliently biased by the spring 34 and is susceptible of being displaced vertically by the displacements of the bellows 32 which are due to variations of pressure in the assembly 30–31–32. By 35 is indicated a discharge of the excess of water in 6.

As already mentioned hereinbefore, the larger portion of the mix passes from a mixer to the other one, becoming more and more homogenized; however according to the invention a small portion of the mix comes to deviate, leaving the vat 110 through the passageway 24 and, after having covered by action of the screw 25 the path up to the passageway 26, returns into the cycle through the latter into the vat 11. With the described device according to the invention it happens that if the mix is too hard, it will displace the piston 29 increasing the pressure in the bellows and controlling thereby a rising of the weir 33 with consequent rising of the water level in the tank 6; then the water wheel 5 will take out a larger quantity of water. That will correct the mix rendering it gradually softer, up to the desired consistency. The reversed thing happens if the mix should be too soft. In such case there is lower pressure in the bellows and, therefore, a lowering of the level of water, namely smaller quantity of water for the mix, which will gradually increase the consistency up to the desired value.

Though only one form of embodiment has been described and illustrated of the invention, however there are possible constructive variants without thereby leaving the scope of the present invention.

What is claimed is:

1. An apparatus for mixing a material while maintaining it at a predetermined degree of hardness, said device comprising a first mixing station, means to add water to said material at said first mixing station, means to regulate the amount of water added to said material, at least one additional mixing station, means for passing said material between adjacent mixing stations, means defining a passage connecting at least two adjacent mixing stations, means in said passage to pass a portion of said material between said latter two adjacent mixing stations, the portion of said means defining a passage which defines one end portion of said passage being displaceable in response to the pressure of the material flowing through said passage, and connecting means operatively connecting said portion of said means defining a passage to said regulating means to regulate the amount of water applied to said mixture at said first mixing station in response to movement of said portion of said means defining a passage.

2. The apparatus of claim 1, wherein said means to pass said materials comprises a compression screw rotatably mounted in said means defining a passage.

3. The apparatus of claim 1, wherein said means to add water comprises a water tank.

4. The apparatus of claim 3, wherein said regulating means comprises an adjustable weir disposed in said tank for controlling the water level thereof.

5. The apparatus of claim 4, wherein said connecting means comprises a closed pneumatic assembly connected at one end to said portion of said means defining a passage and at the other end to said weir, so that the internal pressure of said assembly varies in response to said displacement and controls the position of said weir in said tank.

6. The apparatus of claim 5, wherein said closed pneumatic assembly comprises two deformable members, one of which is connected to said weir and the other of which is connected to said portion of said means defining a passage, a pipe connected at each end to a deformable member, and a fluid disposed within said pipe, so that movement of said portion of said means defining a passage displaces said weir.

7. The apparatus of claim 1, further comprising a cylinder communicating with said means defining a passage and a piston member displaceably mounted in said cylinder, one end of said piston member forming said portion of said means defining a passage.

8. An apparatus for mixing a material while maintaining it at a predetermined degree of hardness, said device comprising a first mixing station, means to add water to said material at said first mixing station, means to regulate the amount of water added to said material, at least one additional mixing station, means for passing said material between adjacent mixing stations, means defining a passage connecting at least two adjacent mixing stations, mechanical means in said passage to pass a portion of said material between said latter two adjacent mixing stations, a portion of said means defining a passage being displaceable in response to the pressure of the material being passed through said passage in response to said mechanical means, and connecting means operatively connecting said portion of said means defining a passage to said regulating means to regulate the amount of water applied to said mixture at said first mixing station in response to movement of said portion of said means defining a passage.

9. The apparatus of claim 8, wherein said mechanical means comprises a compression screw rotatably mounted in said means defining a passage.

10. The apparatus of claim 8, wherein said means to add water comprises a water tank.

11. The apparatus of claim 10, wherein said regulating means comprises an adjustable weir disposed in said tank for controlling the water level thereof.

12. The apparatus of claim 11, wherein said connecting means comprises a closed pneumatic assembly connected at one end to said portion of the surface defining said passage and at the other end to said weir, so that the internal pressure of said assembly varies in response to said displacement and controls the position of said weir in said tank.

13. The apparatus of claim 12, wherein said closed pneumatic assembly comprises two deformable members, one of which is connected to said weir and the other of which is connected to said portion of the surface defining said passage, a pipe connected at each end to a deformable member, and a fluid disposed within said pipe, so that movement of said portion of the surface defining said passage displaces said weir.

14. The apparatus of claim 8, further comprising a cylinder communicating with said means defining a passage and a piston member displaceably mounted in said cylinder, one end of said piston member forming said portion of said means defining a passage.

References Cited
UNITED STATES PATENTS

| | | | |
|---|---|---|---|
| 1,544,705 | 7/1925 | Wallace | 137—92 |
| 1,789,386 | 1/1931 | Kalle | 137—92 X |
| 1,966,638 | 7/1934 | Morgan | 137—92 |
| 2,602,461 | 7/1952 | Walker | 137—92 X |
| 3,035,532 | 6/1962 | Braibanti et al. | 107—30 |
| 3,195,866 | 7/1965 | Coats | 137—92 X |

WALTER A. SCHEEL, *Primary Examiner.*

J. M. BELL, *Assistant Examiner.*